Jan. 11, 1944. F. F. ELLINGWOOD 2,338,806
CAST RESIN MOLD
Filed Dec. 9, 1938

INVENTOR:
Finley F. Ellingwood
BY
ATTORNEY

Patented Jan. 11, 1944

2,338,806

UNITED STATES PATENT OFFICE 2,338,806

CAST RESIN MOLD

Finley F. Ellingwood, Plainfield, N. J., assignor to Bakelite Corporation, a corporation of New Jersey Application December 9, 1938, Serial No. 244,727

3 Claims. (Cl. 18—39)

This invention relates to the molding of articles from casting resins and similar plastic materials by dipping arbors into a congealable material, preferably molten lead, type metal, and the like, to form "slush" molds in which the plastic materials can be cast and hardened.

As heretofore practiced, the methods of preparing such substances as cast resins and similar plastic materials and the making of useful articles therefrom have necessitated the preliminary forming of molds by dipping a machined die or arbor into a low melting point substance, such as lead or a similarly congealable material, chilling and hardening and removing the casting shell or mold therefrom; a viscous resin is then poured into the mold and the cast resin hardened by placing the mold and its liquid contents into a temperature controlled oven. This process has been satisfactory for the casting of such simple forms as knife handles, unbored pipe stems, rods, and also for large hollow open tubes and the like where the length of the opening in the article is not fixed and has a relatively large diameter. For small bores, however, and particularly those that do not extend the length of the casting, it has been the practice to cast solid pieces which are thereafter drilled or machined.

The difficulties of drilling holes in hardened resin articles are well known in the art and the long bores necessary for pipe stems, cigarette holders and the like are particularly difficult drilling operations in view of the thin walls and small bores necessary. Then again, it is sometimes desirable to make triangular, square, or otherwise regularly shaped openings which are impossible to drill.

It is the object of this invention to form cast resins with bores of a definite and predetermined length which can be unusually small diameters and furthermore to obtain such articles in a condition requiring no further machining or drilling of the bores after removal of the cast resin article from the mold. Briefly, the present invention resides in an arbor for making the mold that is provided with a projecting portion or portions, preferably at its lowest extremity, so that when submerged into a bath of molten metal it forms a "slush" mold provided with slots, depressions and the like; into such projecting portions removable inserts, core rods. etc., can be placed, whereafter plastic material can be poured into the mold and hardened to give castings with finished bores.

The foregoing object, as well as other and additional objects, will be more readily understood by referring to the following description and the drawing which illustrate an embodiment of the invention.

Figure 1:
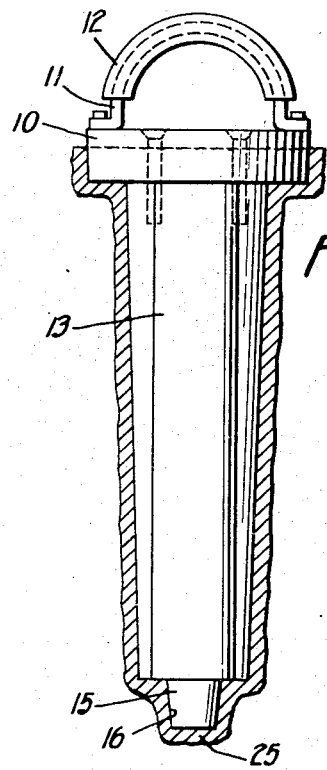
Figure 1 is a side view of an arbor, showing a lead shell or casting mold deposited thereon, a portion of the lead shell being cut away to show the detailed structure of the arbor more clearly.

Referring now in more detail to the drawing, an arbor illustrated in Fig. 1 comprises a handle 11, an insulating sheath 12 and a backing plate 10 which has a molding core 13 mounted on its lower surface. A conical projection 15 is provided at the lower end of the core 13. When dipped into molten lead, a lead shell or casting form 14 freezes and hardens conformably over the arbor the portion contacting the backing plate forming a pouring chamber, while the projection 15 forms a depression 16, preferably conical, adapted to receive a conical end 17, of a removable insert. The arbor is then withdrawn from the lead bath and the lead shell further cooled. When sufficiently hardened, the lead skin layer or shell is jarred loose from the arbor; and the arbor is then withdrawn, leaving a relatively clean and sharply formed lead casting shell or mold.

Figure 2:
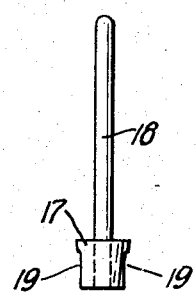
Figure 2 shows a removable hard metal insert for forming a core within the lead mold.
Figure 3:
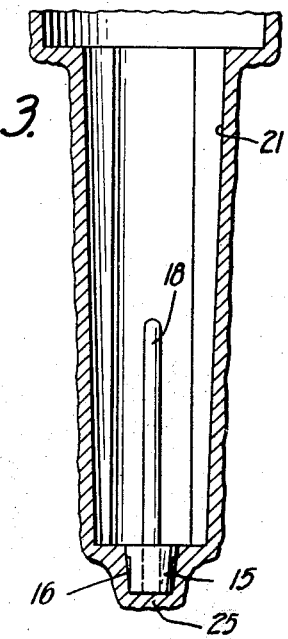
Figure 3 is a vertical section of a casting mold with the insert supported in place within a depression in the mold.

The removable insert, shown in Fig. 2, consists of a long core element 18 of hard metal, such as steel, which is fixed and press-fitted into a conically shaped end member 17. Grooves 19 are cut in the sides of the end member 17 in order to release air that may be entrapped when placed in the depression 16. The cross section of the core element can be circular, square, triangular or other shapes. Because of the weighted end 17 of the insert and its conical shape, it is readily located in the depression 16 by merely dropping it into the mouth of the lead mold and shaking it into position whereupon the conical end 17 drops into the conical depression 16 and automatically centers the element 18.

Figure 4:
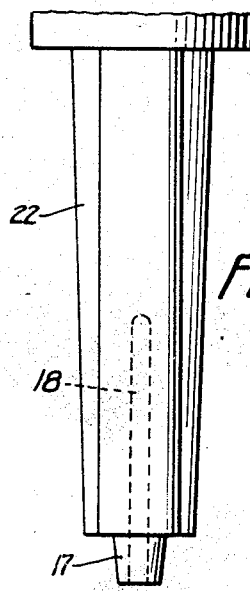
Figure 4 is a lateral view of a hardened cast resin article removed from the lead casting shell with the core element still in place.
Figure 5:
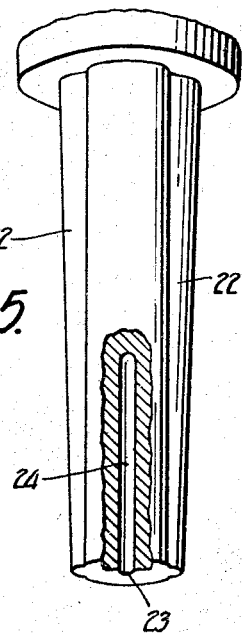
Figure 5 is a perspective view of a finished article after the core element has been withdrawn and is partly broken away to show the bore.

The lead shell is now ready for the casting step. The cavity 21 is filled with liquid resin and the lead shell and its viscous resin contents are then stoved by heating at such a temperature and for such a period of time that the resin sets or cures to a permanently hardened state. The article so formed, such as that shown at 22 in Fig. 4, is first knocked out of the bottom of the deformable lead mold and the removable insert 18 comes out together with the hardened article. When the insert is withdrawn, the finished article 22 as shown in Fig. 5, is obtained with a central opening 23 and a uniformly smooth center bore 24.

The forming of the uniformly smooth center bore as herein disclosed permits the making of complicated molds with cores of substantially any desired length and any size and shape of cross-section; moreover the bores produced are perfectly smooth and require no further machining. Square, triangular and variously shaped straight cores can be made by means of this invention.

It is to be understood that the disclosure herein specifically described is illustrative and not a limitation of the invention except as defined in the claims.

What is claimed is:

1. A mold for the casting of a bored article from a liquid resin solidifying in the mold by heating comprising in combination a deformable slush mold having a depression forming a continuous extension of the bottom of the casting space and having a conical shape converging toward its outer extremity, and a separable core comprising an attenuated element of a length and a cross-section corresponding to that of the bore desired in the cast article and an end member fixed to and of greater cross-section than the element, said member being of conical shape in correspondence with that of the depression for solely maintaining the core in spaced relation to the walls of the mold casting space upon seating the core member in the depression.

2. A mold for the casting of a bored article from a hardenable liquid plastic comprising in combination a deformable mold having a depression forming a continuous extension of the casting space and of conical shape converging toward its outer extremity, and a separable core comprising an attenuated element of a length and a cross-section corresponding to that of the bore desired in the cast article and an end member fixed to and of greater cross-section than the element, said member being of conical shape in correspondence with that of the depression for solely maintaining the core in spaced relation to the walls of the mold casting space upon seating the core member in the depression.

3. A mold for the casting of a bored article from a hardenable liquid plastic comprising in combination a deformable mold having a depression forming a continuous extension of the casting space in the mold and a separable core element of a length corresponding to that of the bore desired in the cast article and having an end member corresponding in configuration to the depression for seating in the depression and solely maintaining the element in spaced relation to the walls of the mold casting space.

FINLEY F. ELLINGWOOD.